United States Patent
Winchester

(10) Patent No.: US 7,712,709 B2
(45) Date of Patent: May 11, 2010

(54) FLEXIBLE CONDUIT STORAGE ORGANIZER

(76) Inventor: Mary Annette Winchester, 254 Twin Oak, Seguin, TX (US) 78155

(*) Notice: Subject to any disclaimer, the term of this patent is extended or adjusted under 35 U.S.C. 154(b) by 131 days.

(21) Appl. No.: 11/810,436

(22) Filed: Jun. 5, 2007

(65) Prior Publication Data
US 2007/0235597 A1 Oct. 11, 2007

Related U.S. Application Data

(63) Continuation-in-part of application No. 11/284,053, filed on Nov. 22, 2005, now abandoned.

(51) Int. Cl.
*A47G 29/00* (2006.01)
*A47F 1/04* (2006.01)

(52) U.S. Cl. ............. 248/89; 211/70.1; 211/87.01; 248/68.1; 248/90

(58) Field of Classification Search ........... 248/75, 248/78, 79, 80, 89, 90, 68.1; 206/145, 158, 206/159, 151, 162; 211/70.1, 87.01, 106.1; D8/356; 138/106, 107, 110, 118
See application file for complete search history.

(56) References Cited

U.S. PATENT DOCUMENTS

| 3,946,877 | A | * | 3/1976 | Galicia | 211/65 |
| 4,506,698 | A | | 3/1985 | Garcia et al. | 137/355.26 |
| 4,836,479 | A | | 6/1989 | Adams | 248/89 |
| D322,746 | S | | 12/1991 | Sassano | D8/356 |
| 5,112,014 | A | | 5/1992 | Nichols | 248/220.3 |
| 5,191,975 | A | * | 3/1993 | Pezzoli et al. | 206/151 |
| 5,775,648 | A | | 7/1998 | Metzger | 248/68.1 |
| 5,806,814 | A | | 9/1998 | White | 248/80 |
| 5,810,461 | A | | 9/1998 | Ive et al. | 312/223.6 |
| 5,816,081 | A | | 10/1998 | Johnston | 70/58 |
| 6,059,215 | A | | 5/2000 | Finnis | 242/400.1 |
| D427,048 | S | * | 6/2000 | Potter et al. | D8/356 |
| 6,079,675 | A | * | 6/2000 | Hsu | 248/75 |
| 6,129,221 | A | | 10/2000 | Shaha | 211/87.01 |
| D463,253 | S | | 9/2002 | Canty | D8/356 |
| 6,484,991 | B2 | | 11/2002 | Sher | 248/316.5 |
| 6,499,608 | B1 | | 12/2002 | Sterling et al. | 211/70.6 |
| D468,996 | S | | 1/2003 | Sarkinen et al. | D8/356 |

(Continued)

OTHER PUBLICATIONS

U.S. Appl. No. 11/284,053, filed Aug. 11, 2006, Office Action.

(Continued)

*Primary Examiner*—Amy J Sterling
*Assistant Examiner*—Tan Le
(74) *Attorney, Agent, or Firm*—Chris Whewell

(57) ABSTRACT

A device which may be mounted to a vertical substrate, and which is useful as a rack for storing flexible conduits, such as wires, cables, hoses and the like in an orderly fashion during their non-use. A device according to the invention comprises a main backbone portion, to which a plurality of fingers are attached. The backbone portion is substantially-linear in a preferred embodiment, and is mounted with its longest length dimension in a vertical orientation. Successive loops of a flexible conduit are looped around successive fingers of the device to provide neat and orderly stowage of otherwise cumbersome conduits. A device according to the invention is especially well-suited for storing garden hoses in garages or residential backyard environments.

6 Claims, 4 Drawing Sheets

U.S. PATENT DOCUMENTS

| | | |
|---|---|---|
| 6,543,100 B1 | 4/2003 | Finley et al. .................. 24/555 |
| 6,575,312 B2 | 6/2003 | Santa Cruz et al. ........ 211/70.6 |
| 6,580,867 B2 | 6/2003 | Galaj et al. ................. 385/137 |
| 6,857,606 B1 * | 2/2005 | Gretz ........................ 248/68.1 |
| 6,946,605 B2 | 9/2005 | Levesque et al. ............ 174/100 |
| D568,254 S * | 5/2008 | Patchett et al. ............. D13/155 |
| 2004/0112767 A1 * | 6/2004 | Ozcan ........................ 206/162 |

OTHER PUBLICATIONS

U.S. Appl. No. 11/284,053, filed Nov. 17, 2006, Office Action.
U.S. Appl. No. 11/284,053, filed Mar. 26, 2007, Office Action.

* cited by examiner

FLEXIBLE CONDUIT STORAGE ORGANIZER

CROSS-REFERENCES TO RELATED APPLICATIONS

This application is a Continuation-in-Part of U.S. patent application Ser. No. 11/284,053 filed Nov. 22, 2005 now abandoned, the entire contents of which are herein fully incorporated by reference.

TECHNICAL FIELD

This invention relates generally to stowage means. More particularly, it relates to a hardware device useful for the orderly stowage of flexible conduits, including wires, cables and hoses.

BACKGROUND

The use of linear, flexible wares such as long wires, cables, hoses and other conduits present a problem from the standpoint of their orderly storage. While typically supplied in neat, orderly coils, once a user unwinds a coil of such material for its first use, it is typical that the flexible ware is never again stored as neatly as in its originally delivered form. In the case of electrical extension cords, it is well-known that such cords are prone to tangling and snarling during normal use. Additionally it is well known to coil them up by hand, by forming a series of loops adjacent to one another in a bundled fashion of common radius. So too it is with garden hoses. Typically, users will cause a garden hose to be coiled for storage after use in an effort to make efficient use of space and to avoid unsightly and cumbersome tanglings. Towards the end of providing improved storage methods for such flexible wares, various workers have provided many contrivances in the prior art, a brief discussion of a few of which now follow.

U.S. Pat. No. 4,506,698 teaches a garden hose storage apparatus particularly adapted for mounting on a substantially-vertical surface, comprising: a side mount having a base adapted to be secured to a substantially vertical surface, and a hollow cantilever journal formed integral with the base and extending outwardly therefrom; an elongated pipe fixed in the cantilever journal and extending outwardly therefrom; and a reel rotatably mounted on the journal. U.S. Pat. No. 4,836,479 describes a hose storage and dispensing rack comprising a U-shaped hose bracket having a close inner end and an open mouth outer end. The close inner end of the bracket pivotally mounts to a generally horizontal base of a bracket support. The bracket support includes a vertical mounting upright with the pivotally mounted hose bracket swinging between a substantially-vertical position engaging against the mounting upright, and a substantial horizontal position overlying the support base. The location of the pivotal engagement between the hose bracket and the bracket support allows for a free pivotal movement of the hose bracket between the two positions, and at the same time provides for a gravity-retention of the bracket in each position. U.S. Pat. No. 5,112,014 sets forth a retainer for holding a peg board hook against the front surface of the board. The retainer has a variable length strap for at least partially encircling the shank of a peg board-mounted hook in restraining relation thereto, and a head or body with a prong removably-insertable in a selected hole of the peg board in the vicinity of mounted peg board hook. The prong has a tang for engaging the rear surface of the peg board. The strap is tensionable for increasing the grip of the retainer on the shank of the associated peg board hook to be retained. U.S. Pat. No. 5,806,814 provides an apparatus for storing a hose, comprising: a) a generally vertically disposed base member for retaining the apparatus in a first direction; b) a horizontally disposed neck member connected to the base member; c) a cross bar member disposed generally centrally and perpendicularly from the neck member; d) first and second posts extending generally vertically and upwardly from ends of the cross bar member for retaining the hose on the apparatus; e) first and second arms extending generally horizontally from the ends of the cross bar member for supporting the hose on the apparatus and retaining the apparatus in a second direction; f) first and second support members disposed about the first and second arms, respectively, for facilitating coiling and uncoiling of the hose; g) a base flange connected to an end of the base member for mounting the apparatus to a generally horizontal surface; and h) first and second arm flanges connected an end of first and second arms, respectively, for mounting the apparatus to a generally vertical surface. U.S. Pat. No. 6,059,215 discloses a hose rack for mounting around and attaching to a portion of a pylon or a similar annular shaped mounting post, the hose rack adapted for receiving various sizes and lengths of a water hose thereon. The hose rack comprises: a) a hose receiving saddle, the saddle having a saddle base with a concave shaped first side, a concave shaped second side, a first end and a second end; b) an upright concave-shaped rack mounting bracket, the concave-shaped first side of the saddle base attached to a front side of the concave shaped rack mounting bracket, a back side of the mounting bracket adapted for conforming to and engaging the portion of the pylon; and c) an upright concave shaped hose retaining bracket. The hose-retaining bracket has a front side and a back side, and the back side of the hose retaining bracket is attached to the concave shaped second side of the saddle base. The retaining bracket with concave shape and the mounting bracket with concave shape are parallel to each other and provide a wrap-around design, and the wrap-around design is adapted for holding the water hose close to the pylon. U.S. Pat. No. 6,129,221 teaches a wall-mounted equipment storage rack system comprising: an elongated anchor defining an axis and having opposed ends, in which the anchor has a fixed portion and a movable latch portion movable along the axis between a retracted position and an extended position. The latch portion extends beyond the fixed portion when the latch is in the extended position. There is also a fastener for securing the anchor to a vertical wall to support a load. There is also a rack having an interface element defining an aperture sized to encompass at least a portion of the anchor, and detachably connectable to the anchor. The rack has an equipment-support portion extending from the interface element. U.S. Pat. No. 6,499,608 provides a wall-mounted storage system which comprises a generally elongated mounting channel having upper and lower rows or hook-receiving openings defined thereby. The system further includes a plurality of storage attachments that are selectively removably positionable on the mounting channel. Each of the attachments includes at least one pair of vertically-spaced, downwardly opening hook-elements. Each pair of hook-elements can be selectively positioned in a respective pair of vertically aligned ones of the hook-receiving openings in the mounting channel, with the variously configured storage attachments providing a highly versatile and easily customized storage system. U.S. Design Pat. No. D 322,746 shows the ornamental design for a garden hose rack, as shown and described in the drawings figures.

While the prior art devices described include some ingenious stowage means, none has provided a simplistic device which is readily useable, of low enough cost that it can be essentially discarded after only a few uses, and which is user-friendly to persons in all age categories. The present invention provides such a device.

SUMMARY OF THE INVENTION

The present invention provides a device useful for the organized storage of flexible conduits, including hoses, wires, and cables. A device according to the invention comprises a backbone portion, having a longest length dimension, a width dimension, a height dimension, a first end portion, and a second end portion. There are a plurality of finger portions, each having a length dimension, a width dimension, a thickness dimension, a first end portion, and a second end portion. The finger portions are disposed along the length dimension of the backbone portion. Each of the finger portions are attached at their first end portion to the backbone portion. The finger portions are oriented such that their length dimensions extend substantially perpendicularly from the backbone portion with respect to the longest length dimension of the backbone portion. One of the finger portions comprises a terminal finger portion, and is disposed adjacent to an end portion of the backbone portion. The terminal finger portion preferably includes a hook means disposed on its second end portion. The backbone portion further comprises, along its length, a plurality of mounting holes disposed therethrough, with the mounting holes having their entire boundaries disposed between the first edge portion and the second edge portion of the backbone portion. In a preferred embodiment, the mounting holes each have an axis, and the axes of the mounting holes are disposed to be substantially parallel to the length dimensions of the finger portions.

DETAILED DESCRIPTION

Figure 1:
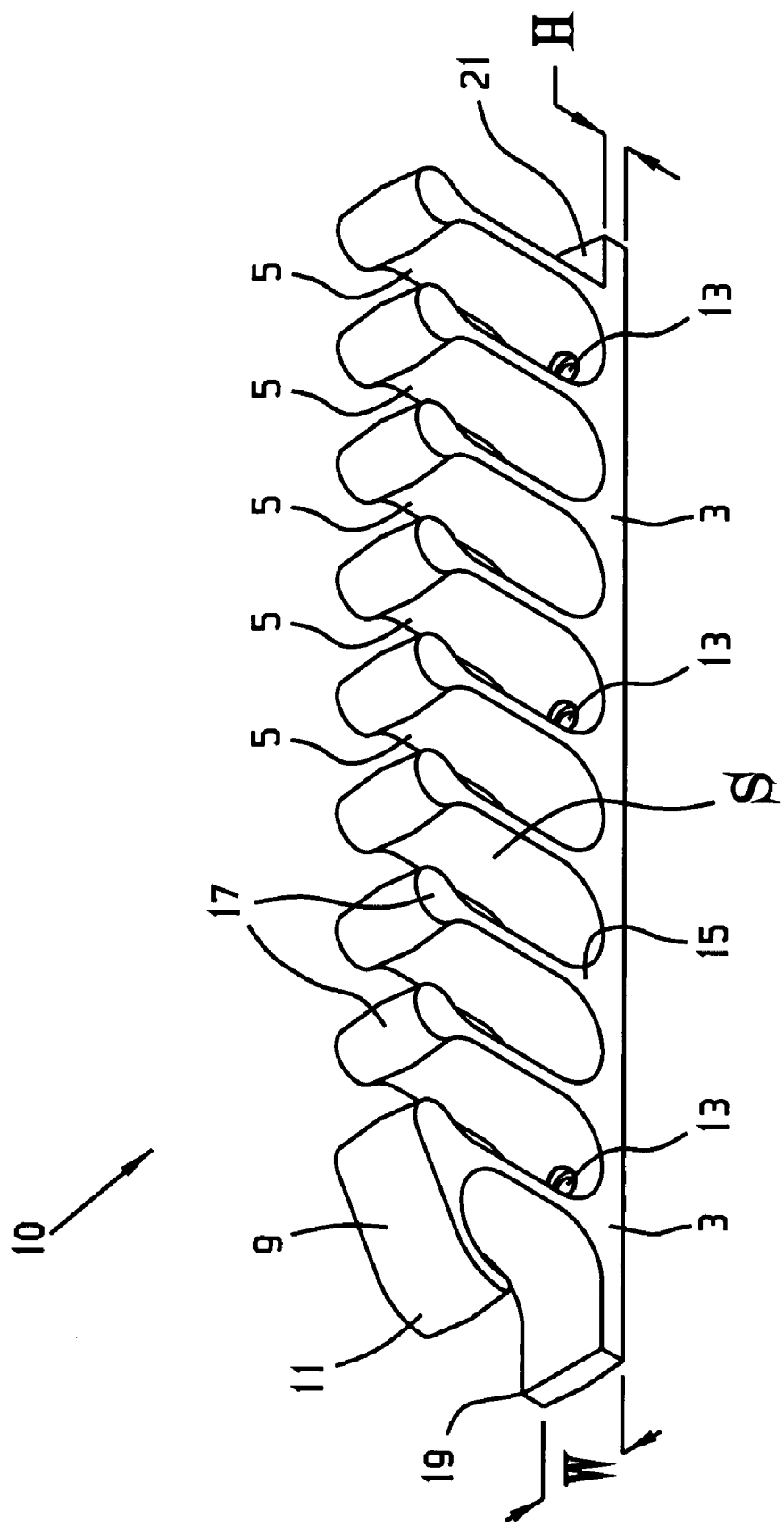
FIG. 1 shows a perspective view of a device according to a preferred form of the invention.
Figure 2:
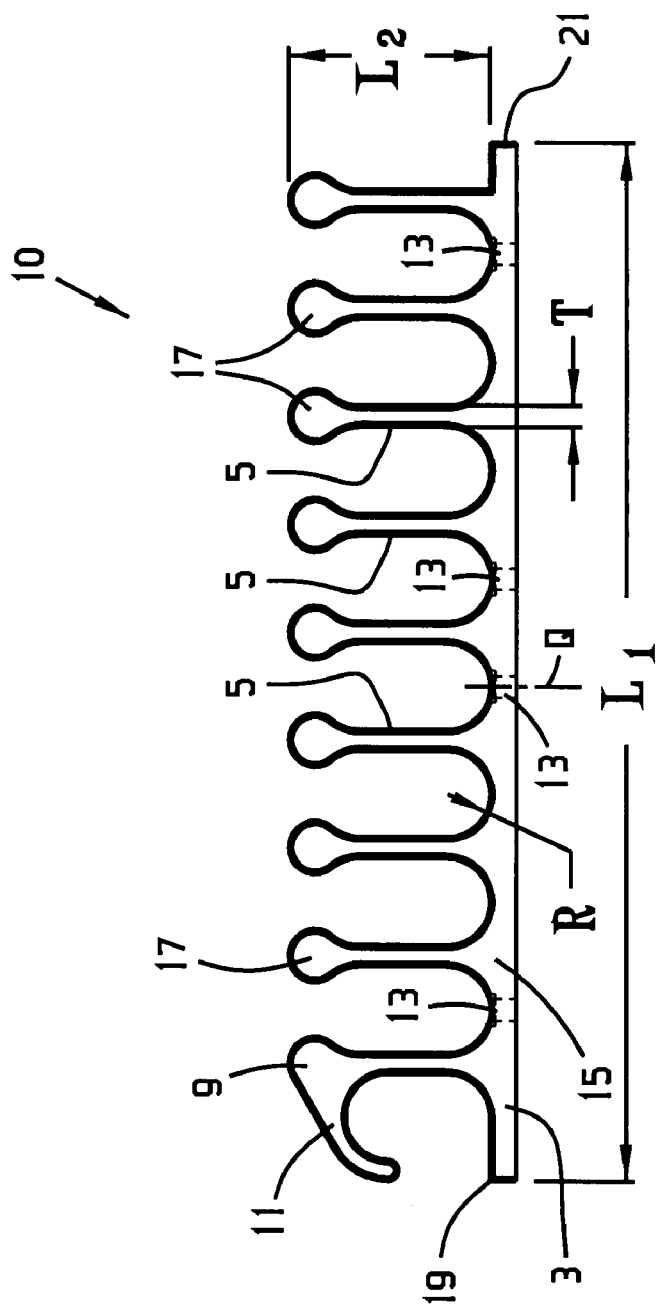
FIG. 2A shows a side view of a device according to a preferred form of the invention.
FIG. 2B shows an end view of a device according to a preferred form of the invention.

Referring to the drawings and initially to FIG. 1 there is shown a perspective view of a device according to a preferred form of the invention. In this FIG. 1 there is shown backbone portion 3, which is substantially linear and has an overall longest length dimension L1 (FIG. 2), a width dimension w, a height dimension h, a first end portion 19, and a second end portion 21. There are a plurality of finger portions 5, each having a length dimension L2 (FIG. 2), a width dimension w, a thickness dimension T (FIG. 2), a first end portion 15 and a second end portion 17. The finger portions 5 are disposed along the length dimension L1 of the backbone portion, such that each of the finger portions 5 are attached at their first end portion 15 to the backbone portion 3. The finger portions 5 are preferably oriented such that their length dimensions L2 extend substantially perpendicularly from the backbone portion 3 with respect to the longest length dimension L1 of the backbone portion 3. One of the finger portions is a terminal finger portion 9, as it is disposed adjacent to an end portion of said backbone portion. The terminal finger portion includes a hook means 11 disposed on its second end portion. In one embodiment, there are a plurality of mounting holes 13 disposed through, and along the length of the backbone portion 3, which are adapted to receive a conventional screw or other fastener (not shown) which is useful for mounting the device 10 to a vertical substrate, such as a post, tree, wall, or any other substantially vertical surface. The screw or fastener is placed through a mounting hole 13, and is then screwed or fastened to the vertical substrate in the mounting of the device 10 in a desired location. The mounting holes 13 may be located at any point along the length of the backbone portion 3, and are preferably disposed between the finger portions 5.

A device 10 according to the invention is intended to function as a support for a hose or other conduit, when the hose or conduit is either in use or is in storage. Accordingly a device according to the invention is preferably comprised of a material having a reasonable strength, and suitable materials include stainless steel, steel, aluminum, any metallic alloys, polymers, polyethylene, polypropylene, alpha olefin copolymers, thermoset resins, thermoplastic vulcanizates, fiberglass, composites, etc. It is especially preferred that a device according to the invention be fabricated from an injection-grade polypropylene, based on its strength and durability.

In FIG. 2A is shown a side view of a device according to a preferred form of the invention, showing the respective locations of the backbone portion 3, finger portions 5, with their first end portions 15 and second end portions 17, the terminal finger 9 with its hook portion 11, the first end portion 19 of the backbone 3, and the second end portion 21 of the backbone 3. The longest length dimension L1 of the backbone 3 is shown, as is the length dimension L2 of the finger portions 5. In a preferred embodiment, the length dimensions L2 of all finger portions 5 are substantially equivalent. In another embodiment, the length dimensions of the finger portions 5 differ from one another. Also shown in FIG. 2A is the thickness dimension T of the finger portions 5, which are in one embodiment substantially equivalent, and in another embodiment may differ from one another. In a preferred embodiment, the space between the finger portions 5 at the point at which they contact the backbone portion 3 are radiused, as shown by R. This is to accommodate a hose or conduit having a circular cross section, for a good fit. In one embodiment, the cross-sectional size dimension of the second end portion 17 of the finger portions 5 is greater than the thickness dimension of the finger portions along their shanks S, which feature allows the user to force a conduit into the space between the fingers, which causes a slight spreading of adjacent fingers upon insertion, for example, when the device 10 is comprised of a polymeric material, which fingers 5 then spring slightly back into place once the conduit is adjacent the fingers, and the larger lobed second end portions 17 then prevent the hose or conduit from easily falling out of the space, as is additionally depicted in FIG. 4. The purpose of the hook portion 11 is apparent when a device 10 according to the invention is mounted on a vertical substrate, as the hook portion 11 is then adapted to hold an uppermost loop of hose or conduit being stored in the device 10, as shown further in FIG. 4. In such employment, the terminal finger 9 which comprises the hook portion is disposed at the top. FIG. 2A shows the location of mounting holes 13, disposed through the backbone portion 3 at locations on the backbone portion 3 that are between the finger portions 5. Axis Q of one of the mounting holes 13 is also shown. In one preferred form of the invention, the axis of each of the various mounting holes 13 are substantially parallel to the length dimension L2 of the finger portions 5. Since the backbone portion has a height dimension h, the mounting holes 13 in some embodiments define a hollow volume which is substantially cylindrical, and the axis of the mounting holes 13 in such embodiments correspond to the axis of the cylindrical volumes they define. Thus, in a preferred form of the invention, the mounting holes 13 are circular in cross section. In one embodiment, the axis of each of the various mounting holes 13 are independently disposed to each be at any angle between about 60 degrees and 150 degrees with respect to the backbone portion 3 as viewed from the side perspective as in FIG. 2A. In another embodiment, the axis of each of the various mounting holes 13 are independently disposed to each be at any angle between about 60 degrees and 120 degrees with respect to the backbone portion 3 as viewed from the end perspective as in FIG. 2B. Thus, in such embodiments the mounting holes 13 may be oriented in any disposition which makes the intersection of their axes with the backbone portion to be any angle between about 60 degrees and about 120 degrees with respect to the backbone portion 3, when a device 10 according to the invention is viewed from either the side perspective or the end perspective. However, the present invention also includes all embodiments in which these angles of intersection between the axes of the mounting holes 13 and the backbone portion 3 are in the range of between about 30 and about 150 degrees, including every degree therebetween and including all possible ranges of angles therebetween. Any angle of intersection of the axes of the mounting holes with the surface of the backbone portion 3 that has the finger portions 5 protruding from it is suitable if it enables a conventional fastener, including nails, nuts and bolts, and screws, for example, to be used to mount a device 10 according to the invention to a substrate capable of receiving such fasteners, and all of such angles are within the scope of the invention. In one preferred form of the invention, this angle of intersection is about 90 degrees, which means that the axes of the holes are disposed to be substantially parallel to the length dimensions of the finger portions, as viewed from either the side perspective or end perspective views. In other embodiments, the mounting holes 13 may be oval, rectangular or of any other cross section that enables a device 10 according to the invention to be mounted to a substrate using conventional fasteners.

In FIG. 2B is shown an end view of a device according to a preferred form of the invention, showing the respective positions of the second end portion 21 of the backbone 3, a finger portion 5 and the second end portion 17 of the finger 5.

Figure 3:
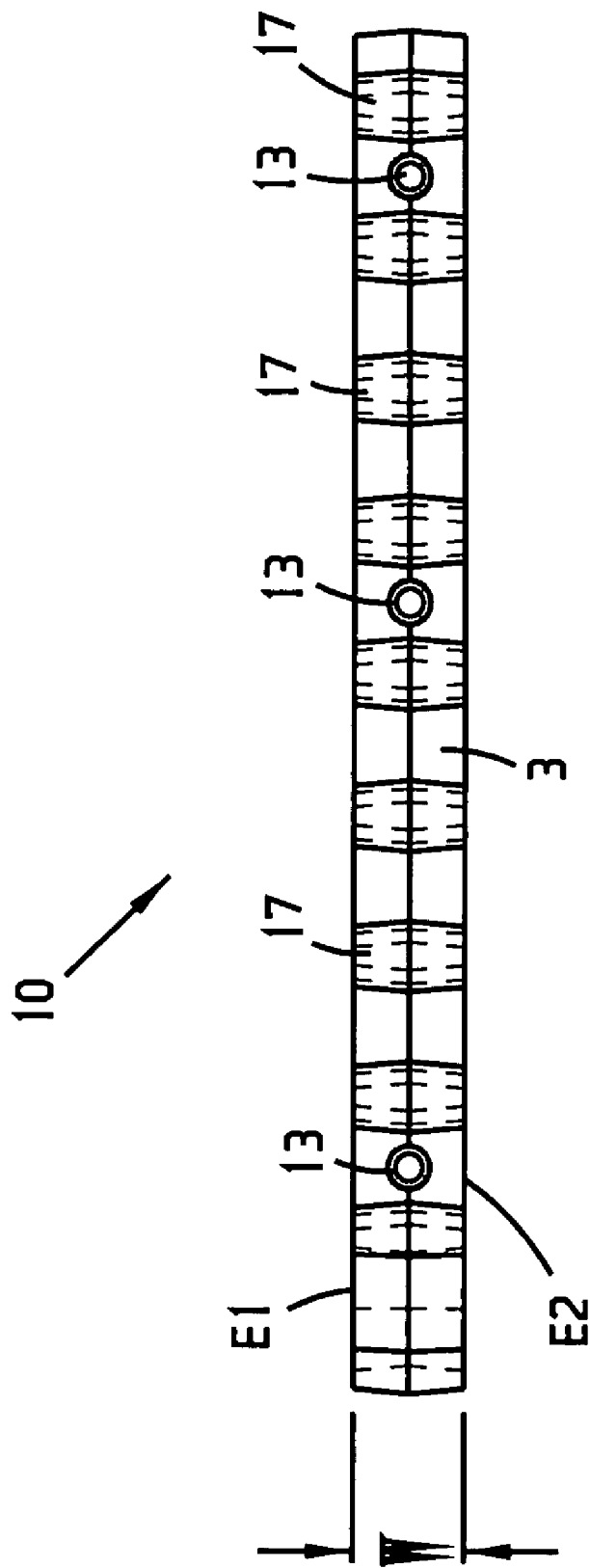
FIG. 3 shows an overhead perspective view of a device according to a preferred form of the invention.

FIG. 3 shows an overhead view of a device 10 according to the invention, showing the respective locations of the mounting holes 13, the second end portions 17 of the finger portions 5, the width dimension W and edge portions E1 and E2. Thus, the mounting holes 13 are disposed at locations along the backbone portion 3 which are between a first edge portion E1 and a second edge portion E2 of the backbone portion, in addition to their being disposed between the finger portions 5 and extending completely through the backbone portion 3. Although shown as being disposed between the particular finger portions 5 as shown in the various figures, the present invention includes embodiments in which two or more mounting holes 13 are each disposed between any two of the finger portions 5, as well as any location on the backbone portion 3 which are not disposed between two of the finger portions 5. From FIG. 3 it is seen that the mounting holes 13 have their entire boundaries disposed between the first edge portion E1 and the second edge portion E2 of the backbone portion. That is, the mounting holes 13 in this embodiment are circular in cross section, having a diameter dimension as viewed from above, with the boundaries of each entire hole being completely disposed between the two edge portions E1 and E2 and not sharing any common feature or boundary with either of the first edge portion E1 or the second edge portion E2.

Figure 4:
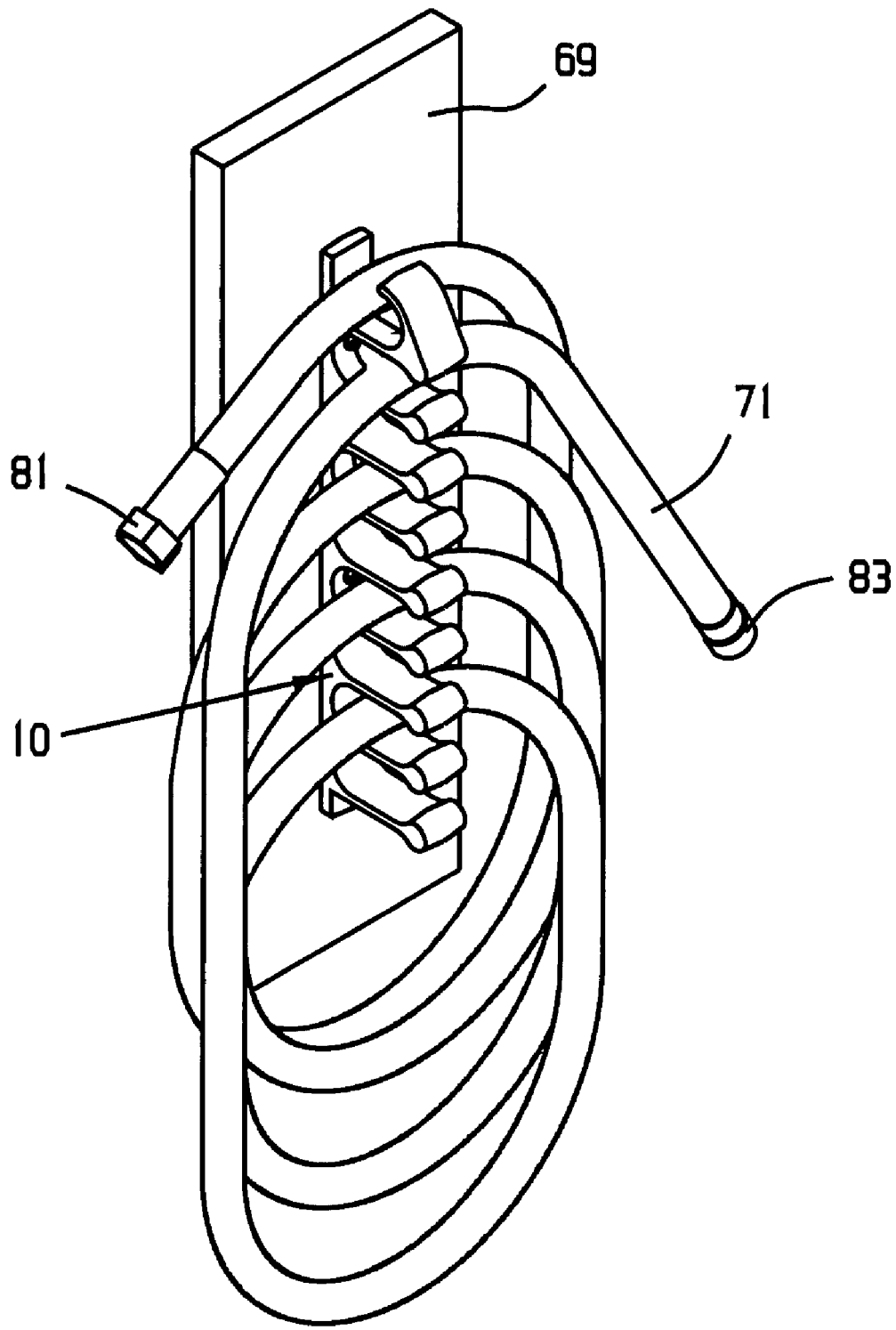
FIG. 4 shows a device according to a preferred form of the invention, vertically mounted to a substrate, with a conduit in place.

In FIG. 4 is shown a device according to a preferred form of the invention, vertically mounted to a substrate 69, which substrate 69 comprises a wooden board, but may comprise any substrate which conventional fasteners disposed through holes 14 (FIG. 1) are capable of grasping sufficiently to enable support of the device 10. Also shown is a conduit 71, which may be a hose, wire, cable or any flexible construct. In the present instance, the conduit 71 is a hose, with standard-thread end portions 81 and 83. The present invention is especially well-suited for storing garden hoses in residential backyard environments.

Although shown and described as having a substantially linear backbone 3, the present invention also includes embodiments in which the backbone 3 is non-linear, including arced backbone portions, provided they comprise a rear surface which can be mounted to a vertical substrate. Additionally, although the finger portions 5 have been shown as having substantially the same width as the backbone portion 3, the present invention includes finger portions 5 which are wider or narrower in dimension than the backbone 3, either along their shanks S (FIG. 1) or at their second end portions 17, or both. In a preferred embodiment, the longest length dimension L1 of a device 10 according to the invention is about 30 centimeters, and the width dimension w is about 2.5 centimeters.

Consideration must be given to the fact that although this invention has been described and disclosed in relation to certain preferred embodiments, obvious equivalent modifications and alterations thereof will become apparent to one of ordinary skill in this art upon reading and understanding this specification and the claims appended hereto. This includes subject matter defined by any combination of any one of the various claims appended hereto with any one or more of the remaining claims, including the incorporation of the features and/or limitations of any dependent claim, singly or in combination with features and/or limitations of any one or more of the other dependent claims, with features and/or limitations of any one or more of the independent claims, with the remaining dependent claims in their original text being read and applied to any independent claims so modified. This also includes combination of the features and/or limitations of one or more of the independent claims with features and/or limitations of another independent claims to arrive at a modified independent claim, with the remaining dependent claims in their original text being read and applied to any independent claim so modified. Accordingly, the presently disclosed invention is intended to cover all such modifications and alterations, and is limited only by the scope of the claims which follow.

What is claimed is:

1. A combination comprising a device useful for the organized storage of flexible conduits, including hoses, wires, and cables, which device comprises:
   a) a backbone portion, having a longest length dimension, a width dimension, a height dimension, a top face and a bottom face, a first end portion, a second end portion, a first edge portion, and a second edge portion;
   b) a plurality of finger portions, each having a length dimension, a width dimension, a thickness dimension, a first end portion, and a second end portion,
wherein said finger portions are attached to and disposed along the length dimension of said backbone portion on its top face, with each of said finger portions being attached at their first end portion to said backbone portion, and wherein said finger portions are oriented such that their length dimensions extend substantially perpendicularly from said backbone portion with respect to the longest length dimension of said backbone portion, wherein one of said finger portions comprises a terminal finger portion, being disposed adjacent to an end portion of said backbone portion, said terminal finger portion being contoured sufficiently to prevent a length of conduit that is present in said hook portion from being pulled off from said device in a direction parallel to the direction said finger portions extend from said backbone and including a hook portion disposed on its second end portion, wherein said backbone portion further comprises, along its length, a plurality of mounting holes disposed therethrough, said bottom face of said backbone portion being substantially flat, and further comprising a substrate to which said device is vertically mounted such that said terminal finger portion is disposed at a height elevation that is vertically higher than the remaining finger portions, and further comprising a flexible conduit in a coiled configuration having a plurality of loops, wherein said loops are disposed between said finger portions such that two adjacent loops in said coiled configuration are disposed between two successive finger portions on said device.

2. A combination according to claim 1 wherein said substrate comprises a substrate selected from the group consisting of: walls, trees, and posts.

3. A combination comprising a device useful for the organized storage of flexible conduits, including hoses, wires, and cables, which device comprises:

a backbone portion having a first edge portion and a second edge portion, and a plurality of finger portions, each of said finger portions having a first end portion and a second end portion wherein said finger portions protrude substantially perpendicularly from said backbone portion, said finger portions being disposed along the length of said backbone portion, wherein one of said finger portions is a terminal finger portion which itself comprises a hook portion disposed on its second end portion, said backbone portion further comprising, along its length, a plurality of mounting holes disposed therethrough, said mounting holes having their entire boundaries disposed between said first edge portion and said second edge portion of said backbone portion, and wherein said terminal finger portion is contoured sufficiently to prevent a length of conduit that is present at said hook portion from being pulled off of said device in a direction parallel to the direction said finger portions extend from backbone, and further comprising a substrate to which said device is vertically mounted such that said terminal finger portion is disposed at a height elevation that is vertically higher than the remaining finger portions, and further comprising a flexible conduit in a coiled configuration having a plurality of loops, wherein said loops are disposed between said finger portions such that two adjacent loops in said coiled configuration are disposed between two successive finger portions on said device.

4. A combination according to claim 3 wherein said substrate comprises a substrate selected from the group consisting of: walls, trees, and posts.

5. A combination comprising a device useful for the organized storage of flexible conduits, including hoses, wires, and cables, which device comprises:

a backbone portion having a first edge portion and a second edge portion, and a plurality of finger portions, each of said finger portions having a first end portion and a second end portion, wherein said finger portions protrude substantially perpendicularly from said backbone portion, said finger portions being disposed along the length of said backbone portion, wherein one of said finger portions is a terminal finger portion which itself comprises a hook portion disposed on its second end portion, said backbone portion further comprising, along its length, a plurality of mounting holes disposed therethrough, said mounting holes having their entire boundaries disposed between said first edge portion and said second edge portion of said backbone portion, and wherein said terminal finger portion is contoured sufficiently to prevent a length of conduit that is present at said hook portion from being pulled off of said device in a direction parallel to the direction said fingers extend from said backbone, wherein said mounting holes do not share any common feature or boundary with either of the first edge portion or the second edge portion, and further comprising a substrate to which said device is vertically mounted by means of a plurality of fasteners disposed through said mounting holes, such that said terminal finger portion is disposed at a height elevation that is vertically higher than the remaining finger portions, and further comprising a flexible conduit in a coiled configuration having a plurality of loops, wherein said loops are disposed between said finger portions such that two adjacent loops in said coiled configuration are disposed between two successive finger portions on said device.

6. A combination according to claim 5 wherein said substrate comprises a substrate selected from the group consisting of: walls, trees, and posts.

\* \* \* \* \*